US011305482B2

(12) United States Patent
Xu et al.

(10) Patent No.: US 11,305,482 B2
(45) Date of Patent: Apr. 19, 2022

(54) CONTINUOUS AND SCALABLE 3D NANOPRINTING

(71) Applicant: Purdue Research Foundation, West Lafayette, IN (US)

(72) Inventors: Xianfan Xu, West Lafayette, IN (US); Bryan William Boudouris, West Lafayette, IN (US); Liang Pan, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 460 days.

(21) Appl. No.: 15/652,105

(22) Filed: Jul. 17, 2017

(65) Prior Publication Data

US 2018/0015661 A1    Jan. 18, 2018

Related U.S. Application Data

(60) Provisional application No. 62/362,868, filed on Jul. 15, 2016.

(51) Int. Cl.
| | |
|---|---|
| *B29C 64/129* | (2017.01) |
| *B29C 64/135* | (2017.01) |
| *B29C 64/245* | (2017.01) |
| *B29C 64/268* | (2017.01) |
| *B33Y 10/00* | (2015.01) |
| *B33Y 30/00* | (2015.01) |

(52) U.S. Cl.
CPC .......... *B29C 64/129* (2017.08); *B29C 64/135* (2017.08); *B29C 64/245* (2017.08); *B29C 64/268* (2017.08); *B33Y 10/00* (2014.12); *B33Y 30/00* (2014.12)

(58) Field of Classification Search
CPC ... B29C 64/129; B29C 64/135; B29C 64/245; B29C 64/268; B33Y 10/00; B33Y 30/00
USPC ......................................................... 264/401
See application file for complete search history.

(56) References Cited

U.S. PATENT DOCUMENTS

| | | | | |
|---|---|---|---|---|
| 2003/0173713 | A1* | 9/2003 | Huang | G03F 7/0037 264/401 |
| 2007/0159690 | A1* | 7/2007 | Ulrich | G02B 21/0032 359/385 |
| 2013/0286179 | A1* | 10/2013 | Markle | G01N 21/6458 348/78 |
| 2016/0067921 | A1* | 3/2016 | Willis | B29C 64/124 264/401 |

OTHER PUBLICATIONS

Evanescent field—Wikipedia, 2015 (Year: 2015).*
Surface plasmon—Wikipedia, 2015 (Year: 2015).*

* cited by examiner

*Primary Examiner* — Matthew J Daniels
*Assistant Examiner* — Yunju Kim
(74) *Attorney, Agent, or Firm* — Purdue Research Foundation (57) ABSTRACT

A rapidly printing 3D nanostructures arrangement, comprising a first photonic source configured to provide photoinitiation energy to a polymer medium via a dynamic light spatial modulator to an excited state to initiate polymerization, a second photonic source configured to selectively provide inhibition energy to the polymerized medium to a depleted state to inhibit polymerization thereby generating a dead zone below a growth zone, the dead zone allows continuous 3D polymerization.

4 Claims, 12 Drawing Sheets

CONTINUOUS AND SCALABLE 3D NANOPRINTING

CROSS-REFERENCE TO RELATED APPLICATIONS

The present patent application is related to and claims the priority benefit of U.S. Provisional Patent Application Ser. No. 62/362,868, filed Jul. 15, 2016, the contents of which is hereby incorporated by reference in its entirety into the present disclosure.

TECHNICAL FIELD

The present application relates to three-dimensional printing, and in particular, continuous three-dimensional printing capable of producing nanoscale structures.

BACKGROUND

This section introduces aspects that may help facilitate a better understanding of the disclosure. Accordingly, these statements are to be read in this light and are not to be understood as admissions about what is or is not prior art.

Recently, there has been growing commercial interest in three-dimensional (3D) printing (also known as additive manufacturing) for rapid prototyping and other purposes. Additive manufacturing tools deposit or extrude material in a layer-by-layer fashion to generate three-dimensional (3D) objects. 3D printing can advantageously generate and rapidly prototype objects that are conceptualized on a computer or scanned from an external object. There are many examples including the popular MAKERBOT (New York, N.Y.), which extrudes molten polymers in a layer-by-layer fashion until a 3D part is complete.

Additive manufacturing is a promising technique for applications ranging from product visualization to on-demand 3D printing of engineering parts. In conventional additive or three-dimensional fabrication techniques, construction of a three-dimensional object is performed in a step-wise or layer-by-layer manner. In particular, layer formation is performed through solidification of a photocurable resin under the action of visible or UV light irradiation. Two techniques are known: one in which new layers are formed at the top surface of the growing object; the other in which new layers are formed at the bottom surface of the growing object. In either case, the current state-of-the-art in most 3D printing is, in fact, the repetitive printing of 2-dimensional objects.

In a typical 3D fabrication process, new layers are formed at the top surface of a growing object, then after each irradiation step the object under construction is lowered into the resin "pool," a new layer of resin is coated on top, and a new irradiation step takes place. An early example of such a technique is given in Hull, U.S. Pat. No. 5,236,637 to Hull (e.g., FIG. 3 of the '637 patent). A disadvantage of such "top down" techniques is the need to submerge the growing object in a (potentially deep) pool of liquid resin and reconstitute a precise overlayer of liquid resin, thus slowing down the growth process.

Figure 1:
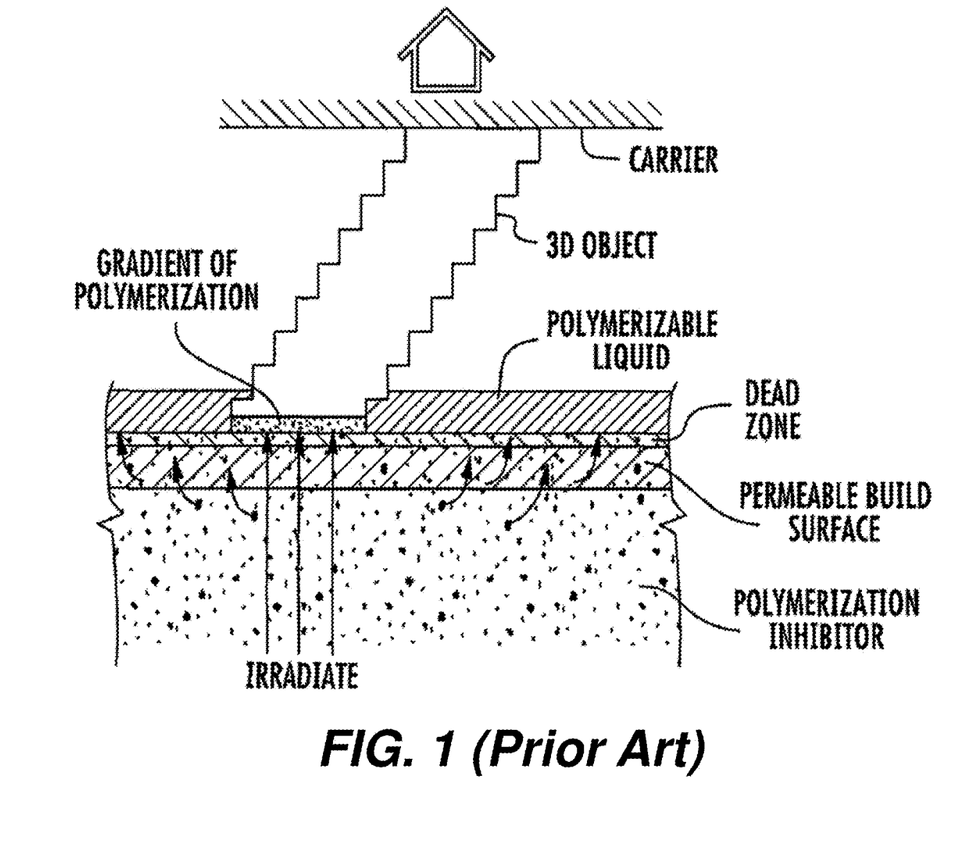
FIG. 1 shows a prior art system for fabrication of monolithic polymeric 3D parts.

A recent breakthrough has dramatically improved the speed of additive manufacturing. As seen in U.S. Pat. No. 9,205,601 to Desimone et al., this technique demonstrates the fabrication of monolithic polymeric 3D parts up to tens of centimeters in size with feature resolutions below 100 µm. FIG. 1 provides a schematic of the arrangement disclosed in the '601 patent. These complex 3D parts were drawn out of the resin through a continuous polymerization process at the interface between the fabricated (polymerized) part and the liquid resin. A key technology is the use of an oxygen-permeable window located directly below the ultraviolet image projection plane of photopolymerization. This oxygen-permeable window generates a dead zone where photopolymerization is inhibited by oxygen between the window and the polymerizing part; therefore the liquid resin can be continuously fed for continuous polymerization. As a result, 3D parts are fabricated at rates of hundreds of millimeters per hour, and the entire fabrication process takes minutes as opposed to many hours. Such a rapid 3D manufacturing process has attracted huge commercial interests as it provides for a complete shift in paradigm and speed relative to other commercial 3D printing systems.

3D nanostructures, because of their unique properties at nanoscale, promise to be useful in myriad applications including efficient solar energy conversion, catalysts for fuel cells and hydrogenation, energy storage, clean water production, and medicine. Some nanomanufacturing efforts employed self-assembly methods to produce 3D nanostructures. Although these 3D nanostructures provided possible solutions for some of the aforementioned applications, it is often desirable to develop methods for fabricating geometrically and structurally well-defined 3D nanostructures in order to realize the full potentials of the 3D nanostructures and to do so in a high-throughput manner. One method that allows for 3D nanostructure fabrication is laser-based polymerization, which has been utilized for producing photonic devices, micromechanical devices for drug delivery, platforms for tissue engineering and cell culture, and microscale machines (e.g., micro-turbines and micro-pumps). However, the current laser-based 3D nanofabrication processes are point-by-point processes and, thus, extremely slow.

The process disclosed in the '601 patent provides a groundbreaking technology to manufacture large, micro structured parts; however there is still no high-throughput solution to directly print 3D nanostructures practically and in large quantities. The window archetype critical for the continuous printing in the '601 patent cannot be scaled to sub-micrometer scale because the diffusion distance of oxygen in the resin is about tens of micrometers.

Therefore, there is a need to scale the rate of 3D nanostructure fabrication by orders of magnitude in order to manufacture components in a manner that will allow for them to be distributed in next-generation technologies.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

A novel arrangement is disclosed that can scale the rate of 3D nanostructure fabrication of the prior art by orders of magnitude. According to one embodiment, an arrangement is disclosed for rapidly printing 3D nanostructures with feature resolution of ~10 s-100 s nm (i.e., at a factor of ~100-1,000 smaller than what is achievable using the current state-of-the-art rapid printing technology). The present disclosure is related to U.S. Pat. No. 9,205,601 to Desimone et al. To provide a dead zone for 3D nanoprinting, a photoinhibition method is used, which is similar to STimulated Emission Depletion (STED). The STED-based technique can inhibit photopolymerization at the nanoscale (2D), with resolution of ~10 s of nm and even below 10 nm. Moreover, the disclosed arrangement is scalable—hundreds of parts can be printed in parallel. A low-cost ultraviolet (UV) light sources are used according to one embodiment. The arrangement according to the present disclosure can: (1) provide a feature resolution two to 2-4 orders of magnitude smaller than that of the process disclosed in the '601 patent; and (2) provide as a printing speed at least 2-3 orders of magnitude faster than the current 3D nanofabrication technology.

Figure 2A:
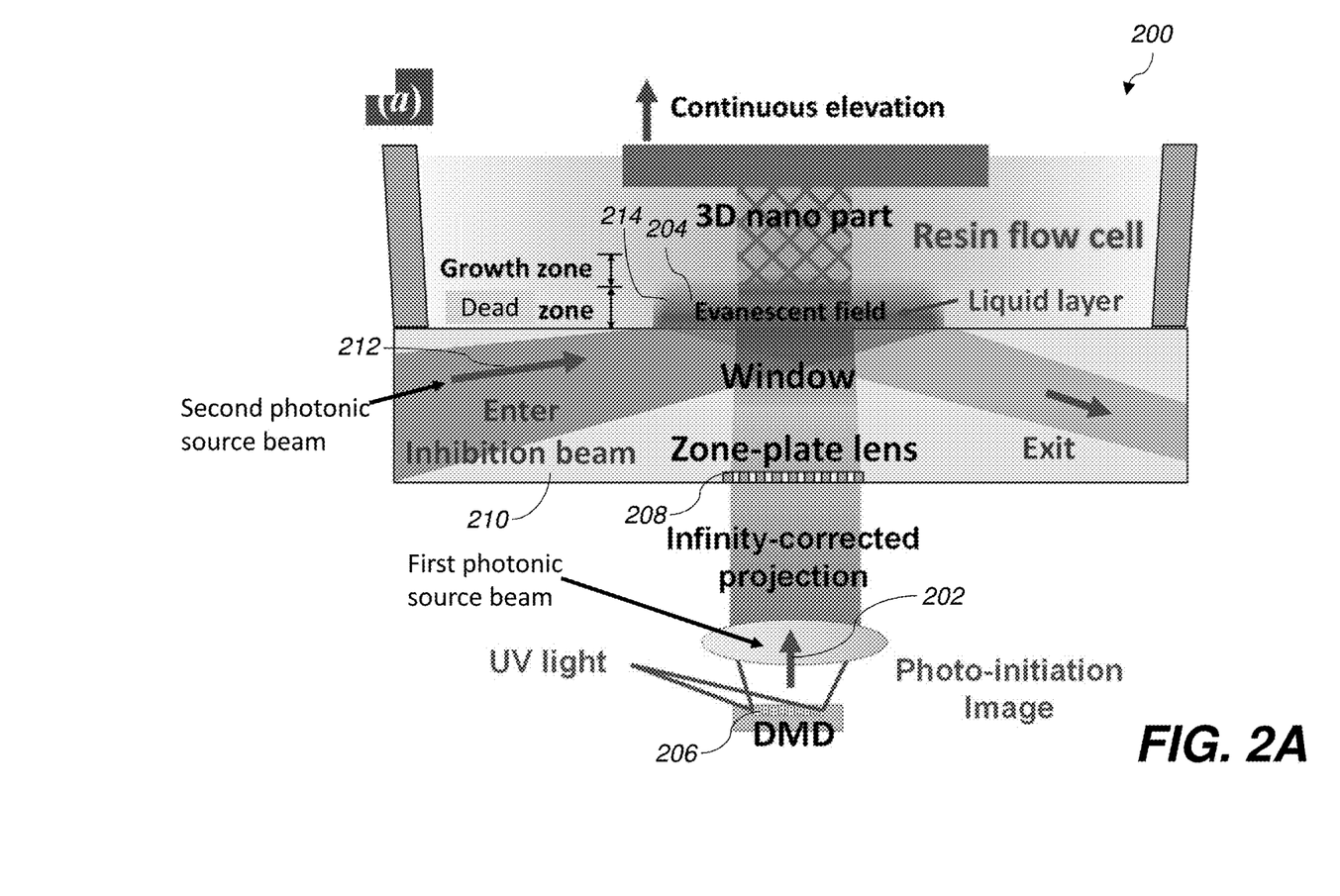
FIG. 2A shows an arrangement for fabrication of 3D parts using an evanescent field to create a dead zone according to one embodiment.
Figure 2B:
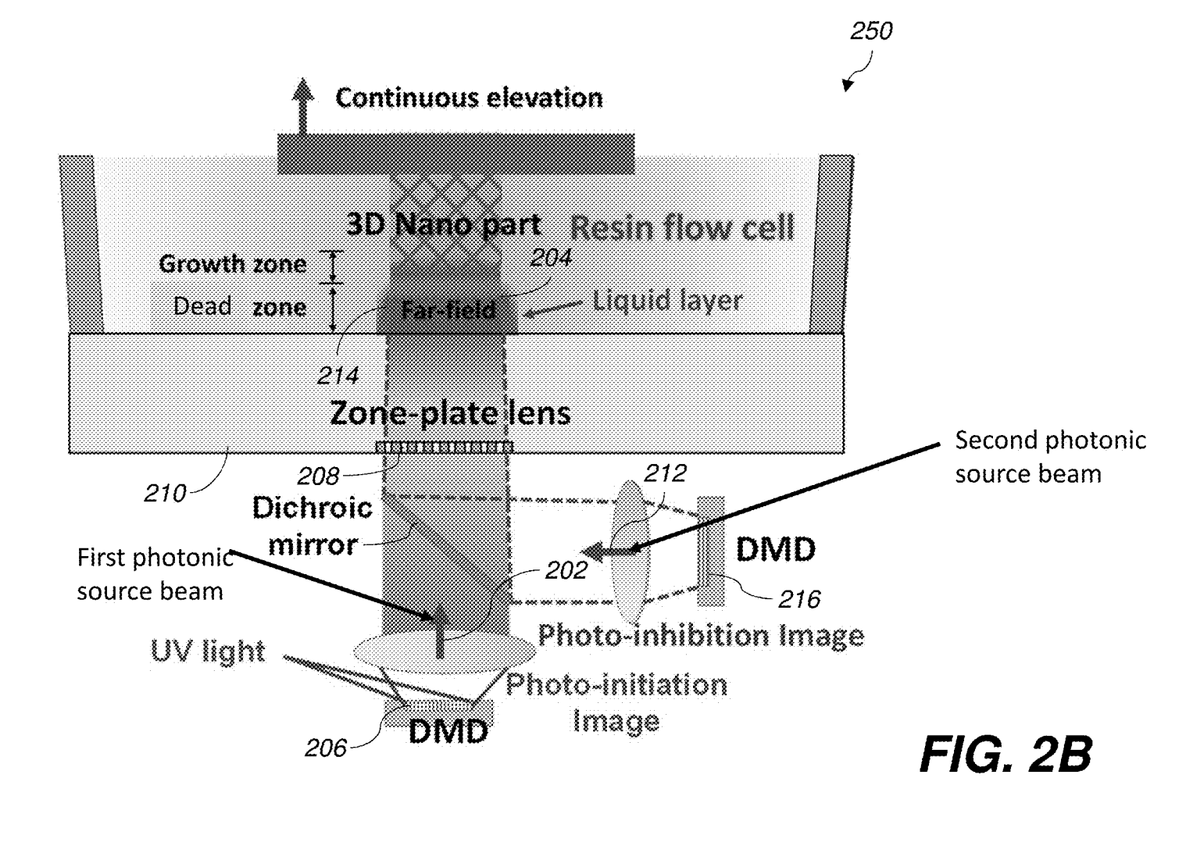
FIG. 2B shows an arrangement for fabrication of 3D parts using a zone plate lens to create a dead zone according to one embodiment.
Figure 2C:
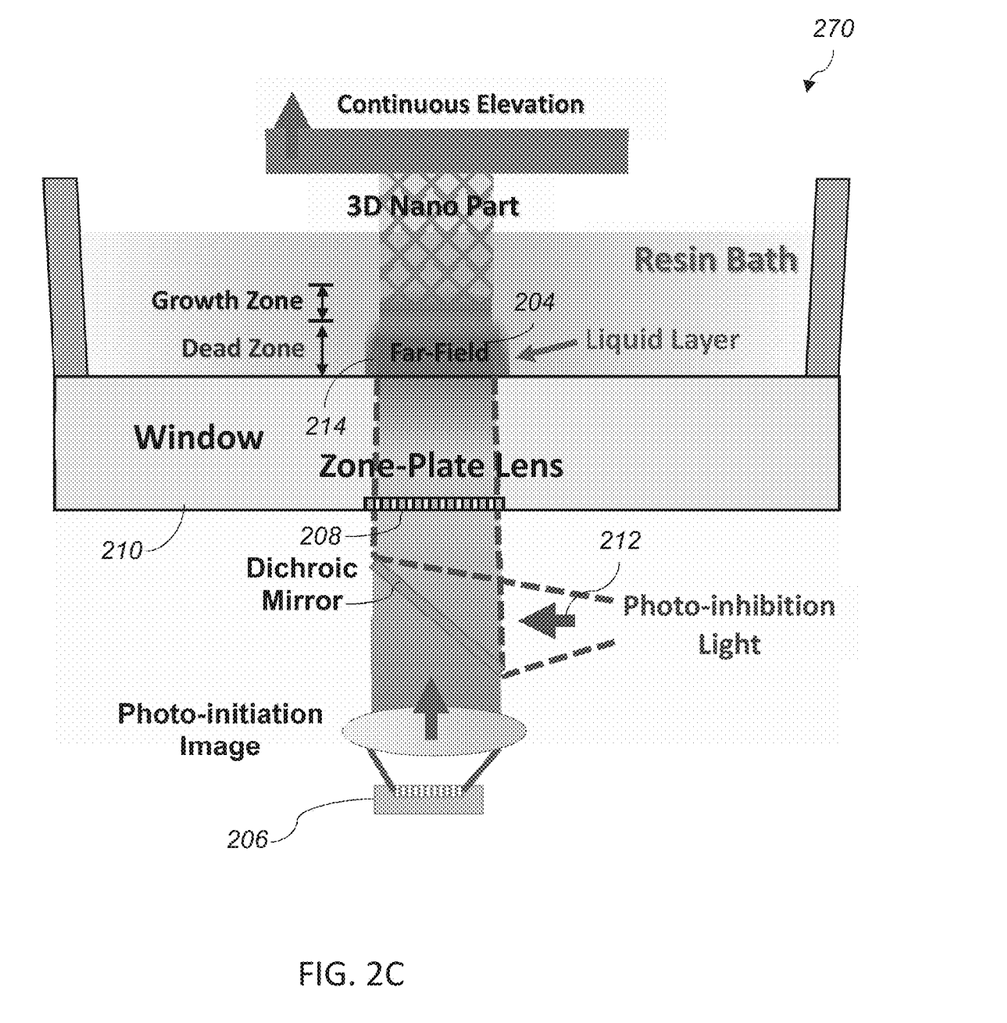
FIG. 2C shows another arrangement for fabrication of 3D parts using a zone plate lens to create a dead zone according to one embodiment.

FIGS. 2A, 2B, and 2C provide schematics of the 3D nanoprinting arrangement 200 according to the present disclosure. A writing optical beam 202 (only shown as a UV laser beam as an instance in the figure but not limited to a UV or a laser beam, moreover, an infrared light source can be used for UV absorption via a multi-photon absorption process) is used for 3D printing through photopolymerization of the liquid resin 204. The UV beam 202 is spatially modulated by a spatial light modulator 206 (only shown as a digital micromirror device (DMD) as an instance but not limited to a DMD) and the patterned UV beam is then projected onto an array of Fresnel zone plates 208 (only one zone plate is shown, and only shown as an instance in the figure but not limited to Fresnel zone plates as light focusing devices) fabricated on a transparent window 210. Each zone plate 208 functions as a miniature solid immersion lens, creating a de-magnified image at the location where it is desired for photopolymerization to occur.

Figure 3:
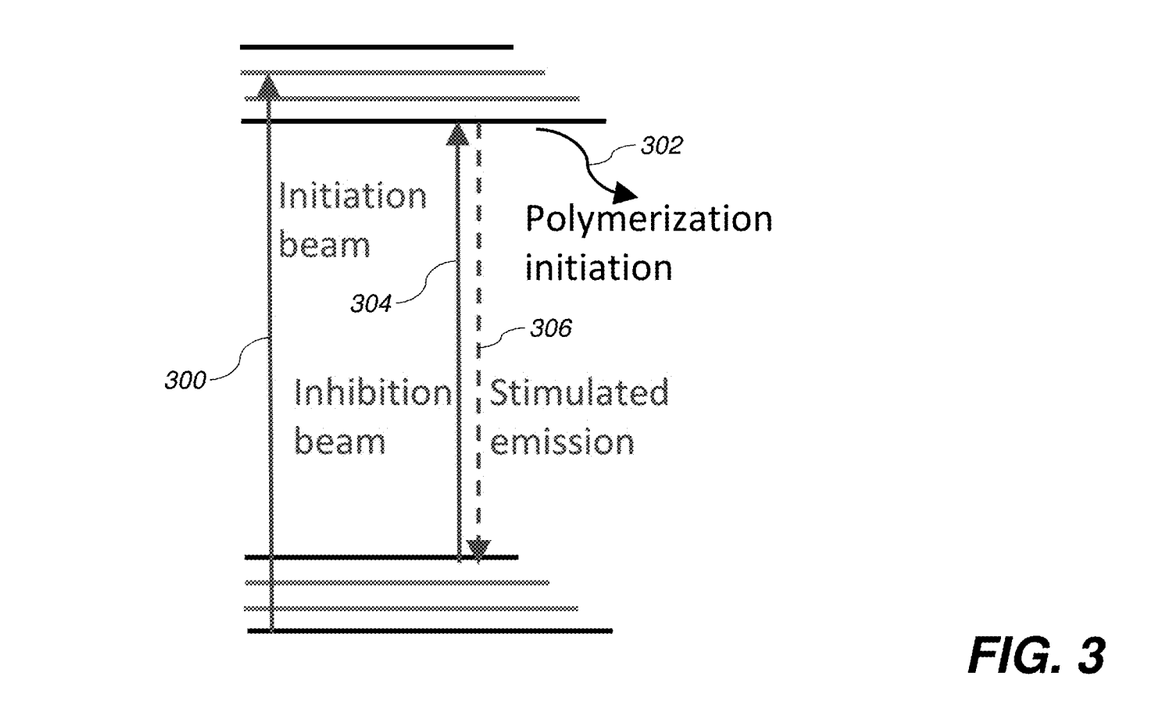
FIG. 3 shows optical transitions in STED-based photoinitiation and photoinhibition according to one embodiment.

Photoinhibition technologies derived from STED are used to create a polymerization dead zone for continuous printing, as illustrated in FIG. 3. An initiation beam 300 excites molecules to an excited state. In the absence of other optical transitions, these excited states initiate polymerization 302. When an inhibition beam 304 is present, it induces a stimulated emission 306 that depletes the excited states (hence, Stimulated Emission Depletion—STED) and, thus, inhibits polymerization and creates a dead zone. In some photo-chemical reactions STED is not involved, and the incident light can produce radicals that can inhibit polymerization. According to one embodiment, an evanescent-type configuration, as illustrated in FIG. 2A is used. In this configuration, the zone plate 208 projects a first photonic source beam 202 image into the resin 204 to initiate photopolymerization, and a second photonic source beam 212 of a different wavelength illuminates at an angle greater than the critical angle of the window-liquid resin interface and excites an evanescent field of a few hundred nm in depth (Further detail provided below). This evanescent field creates a dead zone 214 right below the image plane of the initiation beam to inhibit polymerization. Therefore, unlike any other STED-based 2D nanolithography, the STED-based approach described herein is applied along the depth direction in order to generate a dead zone for 3D continuous polymerization. According to a second embodiment shown in FIG. 2B as arrangement 250, a Fresnel zone plate is used to focus the photopolymerization beam 202 and inhibition beam 212 (only shown as an instance in the figure but not limited to Fresnel zone plates as light focusing devices). The same zone plate is used to project a first photonic source beam 202 as the initiation beam for polymerization and a second photonic source beam 212 as the inhibition beam for creating a dead zone 214 right below (i.e. also along the depth direction) the image plane of the initiation beam 202. The inhibition beam 212 can also carry images generated from the same or a second DMD 216 (only shown as a second DMD in FIG. 2B) for fine tuning the location and depth of the inhibition field and thus improving the fabrication resolution (see below for further detail). According to a third embodiment shown in FIG. 2C as arrangement 270, the dead zone 214 is created using a photo absorbing material whose penetration depth is wavelength dependent. This also allows generation of a dead zone by the inhibition beam 212. Because the thickness of the liquid layer is a few hundreds of nm thick, a liquid resin flow cell can be used. In all embodiments, by pulling the fabricated part away from the printing zone and synchronizing this motion with the projected initiation (and inhibition in FIG. 2B) light beam patterns, continuous printing of 3D nanostructures can be realized.

The evanescent-type arrangement (FIG. 2A) can define a dead zone with a sharper transition to the polymerization zone over a distance of about 100 nm, which provides high resolution in the depth direction normal to the window surface. On the other hand, the zone plate projection arrangement (FIG. 2B) and the use of wavelength dependent photo absorbing material (FIG. 2C) may provide a thicker dead zone. Therefore it is easier for the flow of the resin, and it also provides the freedom to generate the inhibition field at different distances relative to the initiation field according to the required building parameters. It also has more flexibility when choosing the window materials as there is no need to produce an evanescent field, and the numerical aperture (NA) of the zone plate can be made as large as possible (desirable for higher resolution). On the other hand, because the depth of the inhibition image is a few hundreds of nanometers, it requires more diligent efforts to improve the feature resolution along the depth direction such as trimming the depth of the initiation zone by carefully positioning the inhibition image with respect to the initiation image.

The disclosed 3D nanoprinter arrangement can be built on the frame of an inverted microscope, e.g., used for femtosecond laser (800 nm) two-photon 3D photopolymerization nanofabrication with additions of lasers and optical and opto-mechanical components. There are many options of the wavelength for initiation and inhibition beams. The initiation beam can be continuous wave (CW) UV and visible light beams, or infrared (IR) femtosecond pulsed laser beams via a multiphoton absorption process. Furthermore, the inhibition beam can also span from the near-IR to UV either through a STED process to terminate polymerization as shown in FIG. 3, or a process that an inhibition beam produces radicals that terminate polymerization or blocks the initiation beam. The wavelength of the photoinhibition beam can be either longer or shorter than the photoinitiation beam. A wide array of laser sources can be used, including 800 nm femtosecond and picosecond laser systems, which can be frequency doubled and tripled to 400 nm and 266 nm, UV CW lasers, and frequency doubled and tripled YAG and YLF lasers in the visible and UV spectral range. These provide the flexibility of wavelengths for which the photopolymers can be synthesized, and the initiation beam and the inhibition beam wavelengths can be chosen sufficiently apart to increase the fidelity of the printing process. Low-cost, high power UV CW sources at wavelengths such as 355 nm, 266 nm, and 245 nm can also be used as a low-cost 3D parallel nanoprinting system. Other narrow or broad band light sources (including but not limited to such as light emitting diodes, mercury lamps) with or without optical filter can also be used.

The disclosed arrangements are particularly suitable for large throughput scales. An array of the zone-plates or other focusing devices can be fabricated on the window, allowing for large scale parallel printing.

The dead zone for the disclosed arrangement are provided using an evanescent near-field or focusing both the photoinitiation beam and the photoinhibition beam using the same zone plate, as shown in FIGS. 2A, 2B, and 2C. Optical simulations can be performed with the measured photopolymer properties (vide infra) to estimate the power-dependent effectiveness for creating the dead zone.

Figure 4:
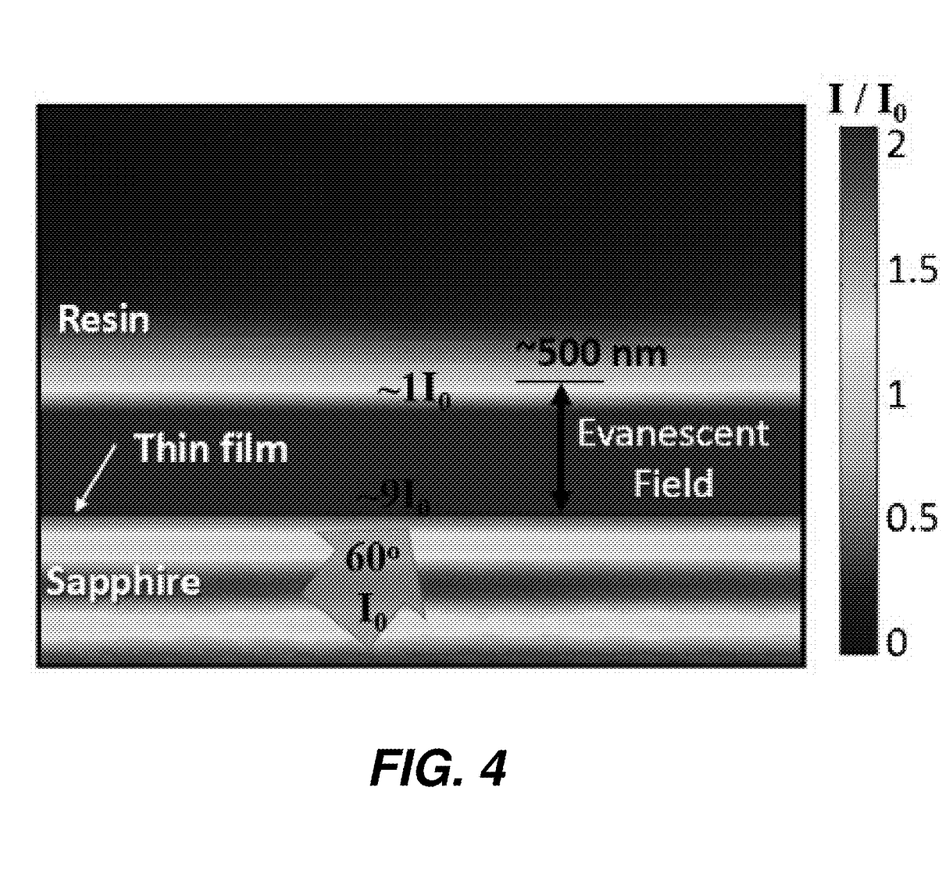
FIG. 4 shows a calculation of the dead zone produced by the evanescent field near the window-resin interface under the Kretschmann configuration according to one embodiment.

FIG. 4 illustrates a calculation of the dead zone produced by the evanescent field near the window-resin interface under the Kretschmann configuration. In this calculation, a thin metal or other photonics film (10 nm gold used in this case) is applied at the window interface which serves as plasmonic material. Other materials (such as nano- or micro-scale structured photonics thin film) can also be used to convert incident inhibition light into surface waves or other modes such as waveguide modes that are trapped near the resin-window interface. The resin typically has an optical refractive index of 1.5 or lower, and a window material with higher refractive index is used to generate the evanescent field. A sapphire substrate and zirconia or diamond coatings are good initial materials candidates for this application because they have indices of refraction of about 1.8, 2.2 and 2.5 in optical frequency respectively. When the incident angle of the photo-inhibiting light is greater than the critical angle of total internal reflection evanescent waves are excited with the momentum matching that of the surface plasmon resonance. Under this condition, the incident energy efficiently excites propagating surface plasmons and the intensity of the reflected light decreases sharply. Because of strong field enhancement near the interface, the evanescent field can extend from the window to a distance of about 500 nm as shown in the calculations in FIG. 4. Outside this 500 nm dead zone, the inhibiting light intensity rapidly drops and polymerization can take place by using the zone plate to focus the photoinitiation beam at 500 nm from the window-resin interface. Further performance improvements are possible by optimizing the thickness and the material of the metal film, within the thickness limit that allows majority of the photoinitiation light passing through.

Figure 5A:
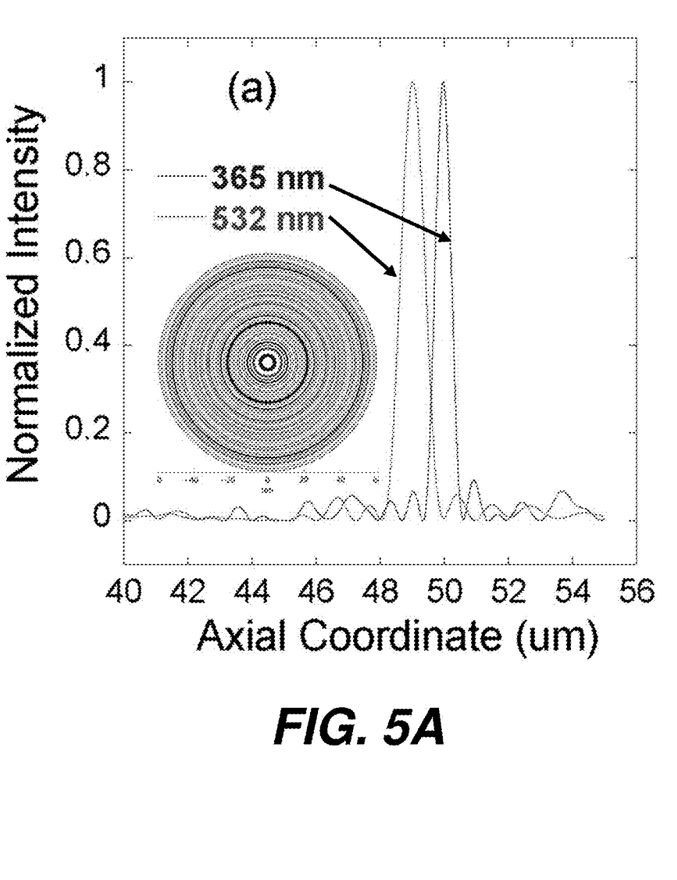
FIG. 5A shows an example design of the zone plates with two focal lengths for two wavelengths wherein a shorter wavelength beam is focused behind the longer wavelength beam according to one embodiment.
Figure 5B:
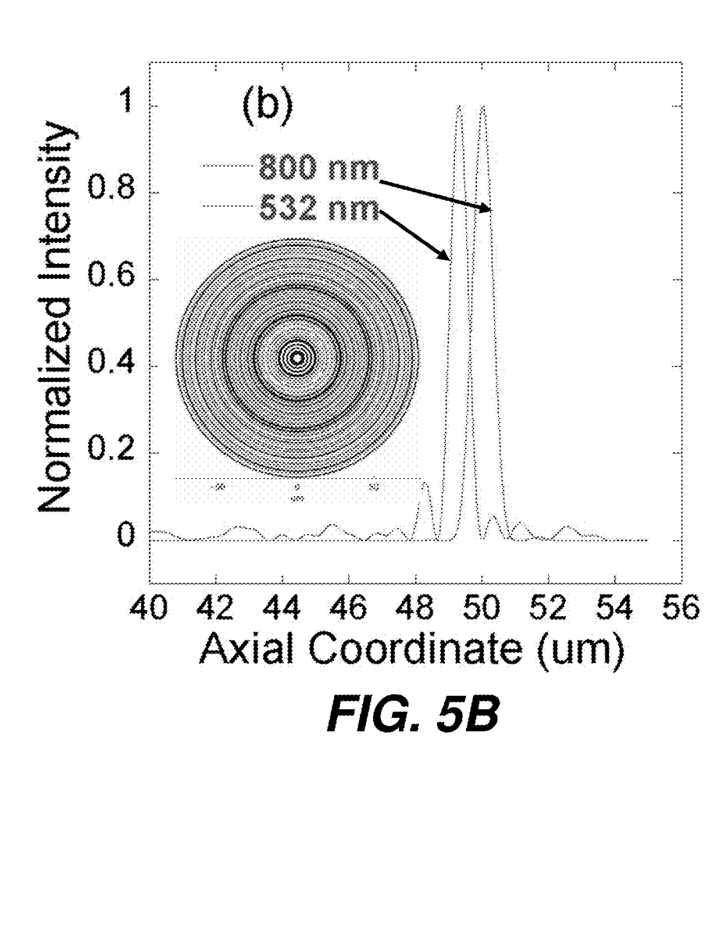
FIG. 5B shows an example design of the zone plates with two focal lengths for two wavelengths wherein a shorter wavelength beam is focused behind the longer wavelength beam according to one embodiment.

It should be noted that it is possible to design the zone plate or other focusing devices to focus the initiation beam and the inhibition beam at two separate locations along the beam propagation direction. As an example, zone plates can be designed to focus light beams of different wavelength in arbitrary order. FIGS. 5A and 5B show two representative example designs of the zone plates with two focal lengths for two wavelengths. In the first case a shorter wavelength beam is focused behind the longer wavelength beam (FIG. 5A), and in the second case the longer wavelength beam is focused behind the shorter wavelength beam (FIG. 5B). The separation distance between the two beams in each case is also adjustable as illustrated in FIGS. 5A and 5B. This will allow trimming the depth of growth zone to improve the build resolution along the axial direction by carefully positioning the inhibiting beam with respect to the initiating beam along the axial direction.

Figure 6:
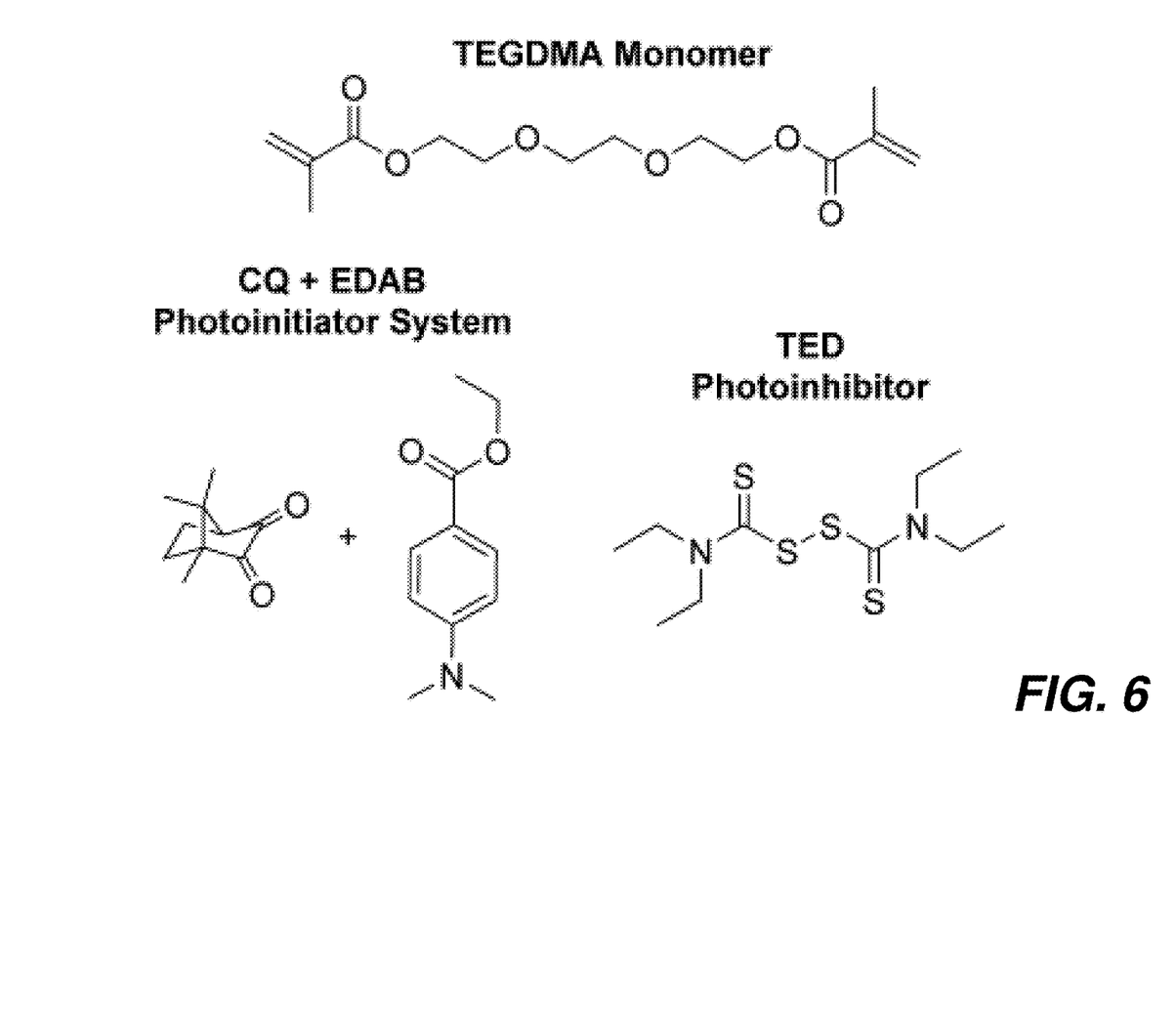
FIG. 6 shows example chemical structures for each of the three components of the 3D nanoprinting system according to one embodiment.

An important factor to the 3D nanoprinting process disclosed here is the use of advanced organic molecular structures that are capable of being converted from a mobile, liquid-like resin state to a rigid, solid-like crosslinked polymer state through a photoinitiated polymerization mechanism, and in the meantime providing for photoinhibition at a different wavelength. Three major molecular components are required. First, the monomer to be polymerized is synthesized in a systematic manner. Second, the photoinitiating species is chosen. Third, the photoinhibiting species is chosen (it can be the same as the initiation species as shown in FIG. 3, or can be a different species to generate radicals to terminate polymerization). Importantly, photoinitiating and photoinhibiting must have complementary absorption spectra. As such, very specific molecular design criteria (see FIG. 6 for example chemical structures) are required for each of the three components of the 3D nanoprinting system. Triethylene glycol dimethacrylate (TEGDMA) is used as it has a rather rapid photopolymerization and gel times at reasonable monomer to photoinitiator concentrations and irradiation intensities. Moreover, for the applications of 3D nanostructures requiring specific properties or multifunctional constitutive materials, because of the relative polar nature of the TEGDMA monomer and its rapid polymerization kinetics, incorporation of other materials into the 3D-printed polymer nanostructure could occur with relative ease.

The choice of the photoinitiating and photoinhibiting small molecules for the polymerization is important as the absorption of these materials will dictate the wavelengths of light used during the photopolymerization process and, thus, the ultimate scale of the 3D-printed nanostructures. According to one embodiment the photoinitiator system of comphorquinone (CQ) and 4-(dimethylamino) benzoate (EDAB) can be used as this system is known to absorb well at longer wavelengths (the maximum in the absorption profile occurs near the wavelength λ=400 nm for the frequency doubled femtosecond laser beam while having relatively weak absorption in the ultraviolet region of the electromagnetic spectrum. This complements the absorption spectrum (i.e., the absorption is negligible at λ>375 nm) of the initially-selected photoinhibitor, tetraethylthiuram disulfide (TED); therefore inhibition of photopolymerization with wavelengths shorter than 375 nm can be achieved. By extending the degree of π-conjugation within the photoinitiator molecular structure, the absorption spectrum can be adjusted to specific wavelengths. Additionally, the addition of specific chemical group functionalities (e.g., mercapto functionalization) can alter the photoinitiating process in STED-based lithography. Therefore, the absorption band of the photoinitiating and photoinhibiting systems can be tuned either through the manipulation of the carbon-carbon bond structure or through the introduction of specific chemical groups along the backbone of these small molecule initiators. In turn, these chemical modifications will afford the manufacturing process to utilize shorter photoinitiating wavelength in deep UV (~250 nm) but much longer photoinhibiting wavelengths. Smaller dimensionality 3D nanostructures and higher fidelity are thus possible during the printing process.

Figure 7A:
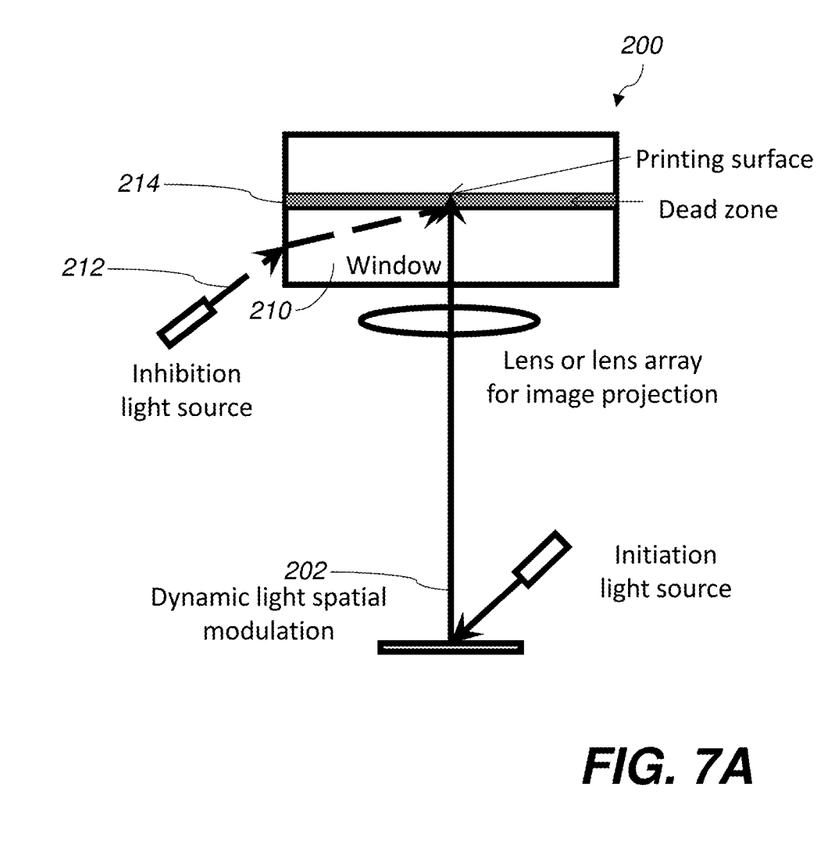
FIG. 7A shows a photonic schematic of the arrangement of FIG. 2A.
Figure 7B:
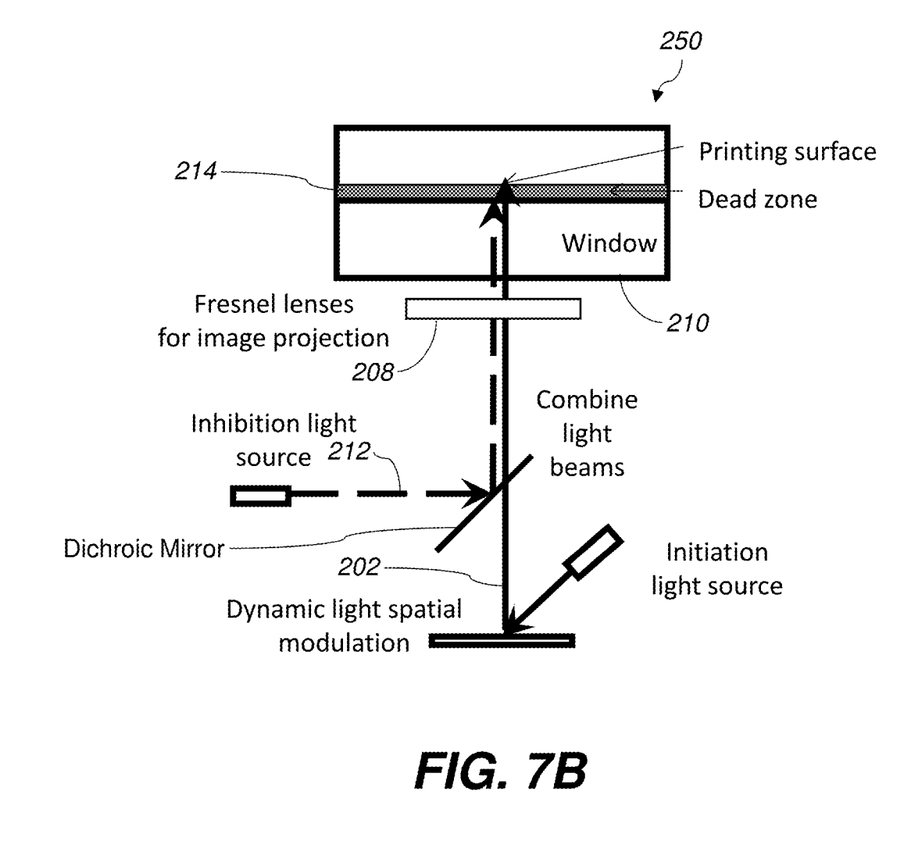
FIG. 7B shows a photonic schematic of the arrangement of FIG. 2B.
Figure 7C:
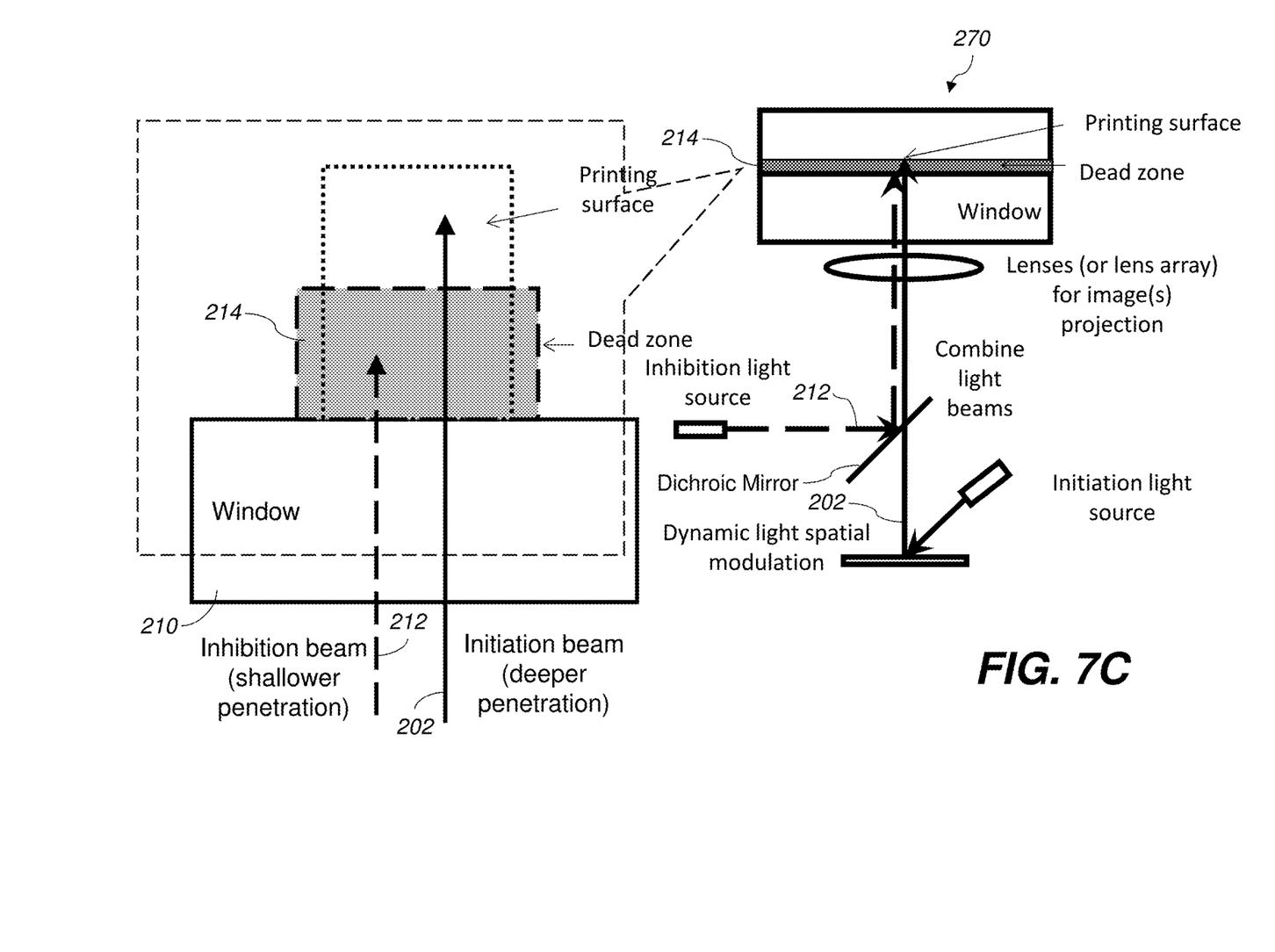
FIG. 7C shows a photonic schematic of the arrangement of FIG. 2C.

Referring to FIGS. 7A, 7B, and 7C, photonic schematics are provided according to the present disclosure. FIG. 7A corresponds to FIG. 2A. FIG. 7B corresponds to FIG. 2B. FIG. 7C corresponds to FIG. 2C Those skilled in the art will recognize that numerous modifications can be made to the specific implementations described above. The implementations should not be limited to the particular limitations described. Other implementations may be possible.

The invention claimed is:

1. A rapidly printing 3D nano structures arrangement, comprising:
   a first photonic source configured to provide photoinitiation energy to a polymer medium via a dynamic light spatial modulation member that directs the photoinitiation energy through a focusing device included on a window, wherein the focusing device projects a photo initiation beam onto the polymer medium and brings the polymer medium to an excited state to initiate polymerization; and
   a second photonic source configured to selectively provide nanoscale light energy confinement and light intensity enhancement to provide inhibition energy to the polymerized medium,
   wherein an inhibition beam from the second photo light source is directed through the window without passing through the focusing device included on the window, wherein the inhibition beam brings the polymer medium to a depleted state to inhibit polymerization thereby generating a nanoscale dead zone below a growth zone,
   wherein the dead zone allows continuous 3D polymerization, wherein the dead zone forms a surface plasmonic field.

2. The rapidly printing 3D nanostructures arrangement of claim 1, the first and second photonic sources are applied to the polymer medium at substantially different angles.

3. The rapidly printing 3D nanostructures arrangement of claim 1, wherein the focusing device comprises an array of lenses, wherein photo initiation beams of a plurality of photonic sources pass through the array of lenses prior to being projected on to the polymer medium.

4. The rapidly printing 3D nanostructures arrangement of claim 3, wherein the array of lenses comprises an array of Fresnel zone plates.

* * * * *